March 22, 1949.  A. KUEHN  2,464,980
LAWN MOWER PROPULSION
Filed June 7, 1945
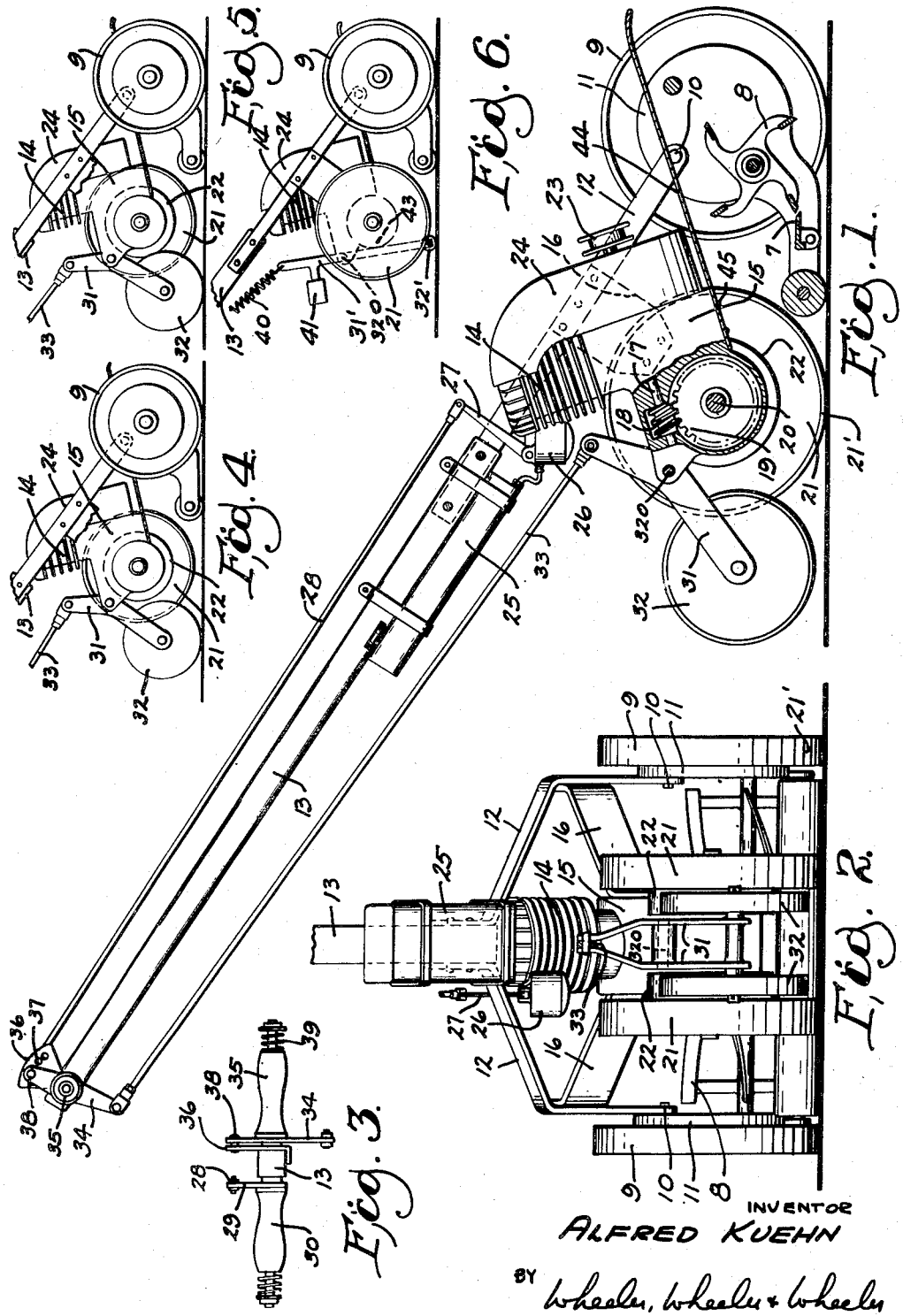
INVENTOR
ALFRED KUEHN
BY Wheeler, Wheeler & Wheeler
ATTORNEYS Patented Mar. 22, 1949

2,464,980

UNITED STATES PATENT OFFICE 2,464,980

LAWN MOWER PROPULSION

Alfred Kuehn, Wauwatosa, Wis.

Application June 7, 1945, Serial No. 598,113

11 Claims. (Cl. 180—19)

This invention relates to improvements in lawn mower propulsion.

One of the primary objects of the invention is to provide propelling means applicable to conventional lawn mowers without requiring any driving connections to the wheels or reels of such mowers. I accomplish this result by preferably making my propelling device as a separate unit assembled upon a lawn mower handle interchangeable with the handle of a conventional mower. Thus, while my self-propelled lawn mower may be made and sold as a complete lawn mower, the invention is also applicable with equal facility to existinng lawn mowers with no change other than such as is involved in a mere substitution of handles.

Other objects of the invention include the provision of a self-propelled lawn mower which may be pushed beneath shrubbery with substantially the facility of a conventional mower; the provision of simple and effective means for starting, stopping the mower without the expense or operation of a clutch; the provision of means for reversing the direction of drive without the expense or operation of a reversing clutch or gear; the provision of controls which are semi-automatic in the sense that they operate without conscious effort on the part of the person in charge; and generally the provision of a low cost and simple and easily operated self-propelled mower.

Other objects will appear in more detail in connection with the following disclosure of my invention.

In the drawings:

Fig. 1 is a side elevation of a mower embodying the invention, portions being broken away to expose its interior construction.

Fig. 2 is a fragmentary rear elevation of the device shown in Fig. 1, the handle lever being broken away.

Fig. 3 is a rear elevational view of the handle grips at the end of the handle lever.

Figs. 4 and 5 are views in side elevation on a reduced scale showing idling and reversing positions of the parts, portions being broken away.

Fig. 6 is a view similar to Figs. 4 and 5 showing a modified embodiment of the invention.

The mower proper is of a conventional type having a knife 7, a coacting reel 8 and supporting and driving wheels 9. Studs 10 projecting inwardly from the frame elements 11 are conventionally provided to receive the apertured ends of the fork members 12 which are bolted to the lower end of the handle lever 13.

In accordance with the present invention, I remove the conventional handle in its entirety and substitute a handle with which the propulsion means hereinafter to be described is unitarily assembled. An engine comprising the cylinder 14 and crank case 15 is carried by brackets 16 from some suitable portion of the handle such as the fork arms 12. The extended crank shaft 17 has driving connections, here exemplified by a worm 18 and worm gear 19, to a shaft 20 carrying one or more driving wheels 21. These wheels, for purposes presently to be described, are preferably provided with enlarged hub portions 22.

The shaft 17 is provided with some means of starting the engine, here exemplified by a pulley 23 upon which a conventional starting cord may be wound preliminary to pulling the cord for rotating the shaft. A blower housing for cooling the motor is shown at 24. The fuel supply tank 25 may conveniently be suspended from the handle lever 13 and connected to the carburetor 26. Thus the entire propelling device comprises a unitary assembly with the handle of the mower.

The usual speed control valve has a lever 27 which may be connected by a link 28 with an arm 29 on grip 30 rotatably mounted at the upper end of the handle lever 13. The direction of operation of the control valve is preferably such that as the handle lever 13 is lifted by the operator, the grasp of his hand on the grip 30 will tend to oscillate the grip counterclockwise, as viewed in Fig. 1, and thereby to produce a similar oscillation of the lever 27 to close the throttle valve and thereby to reduce the speed of the engine to an idling speed.

The lifting of the handle lever serves in lieu of a clutch to arrest the forward propulsion of the mower, since it lifts the driving wheel or wheels 21 from the ground. The coincident, semi-automatic throttling of the engine due to the action of the operator's left hand on the grip 30 will prevent the engine from undue acceleration when relieved of load due to the lifting of its ground wheels 21 from the surface of the earth. These traction wheels are preferably provided with tires or other elastic covering 21'.

For many purposes, it may not be desired to support the ground wheels free of the earth. However, when it is desired to allow the mower to remain at rest with the engine continuing in operation, I may provide a lever 31 pivoted at 320 to a rearwardly extending gear on the crank case. This lever carries an idling ground wheel 32 which, as shown in Fig. 1, is normally free of the surface of the earth. A link 33 connects lever 31 with an arm 34 on the righthand grip 35 at the upper end of the handle lever 13. A segment 36 connected with the lever is provided with a number of apertures at 37 adapted to receive pin 38 carried by an upward extension of arm 34. The grip is not only oscillatable but axially yieldable against the bias of compression spring 39 so that a slight axial movement of the grip will free the stud 38 from the particular aperture 37 with which it is then engaged, whereupon the grip may be oscillated to engage the stud 38 in a different aperture.

The oscillation of the grip, communicated to lever 31 by means of link 33, enables the operator to oscillate the ground wheel 32 to a position where it, rather than the driving wheels 21 of the engine, will sustain the weight of the engine and handle as shown in Fig. 4. In this position, the engine may continue to idle, even while the operator's hands are disengaged from the hand lever. This is a convenient position for starting the engine.

As shown in Fig. 2, I preferably provide not one but two of the idler wheels 32, disposing these in the respective planes of the hubs 22. When it is desired to reverse the direction of mower propulsion, the righthand grip 35 at the upper end of the lever may be manipulated in the manner above described to oscillate the idler wheels 32 sufficiently forwardly as viewed in Fig. 5 to contact the hubs 22 so that the motion communicated to the wheels 21 by the engine will now be transmitted frictionally through the hubs 22 to the normally idle wheels 32, thereby driving such wheel in a reverse direction.

In the more simple construction shown in Fig. 6 all the control functions of the righthand grip are dispensed with. The lever 31' carries at its lower end merely a very small roller 32'. The lever is biased either by a spring 40 or a weight 41, or both, toward the supporting position shown in Fig. 6, wherein the driving wheels 21 of the engine are lifted from the earth. Engagement of the lever 31' with the portion 43 of the gear case provides a stop to limit any further counterclockwise oscillation of lever 31' about its fulcrum 320. Whenever the handle lever 13 is manually lifted toward the position shown in Fig. 6, the bias of the stand lever 31' will swing the stand to its operative supporting position as illustrated. However, if the operator pushes forwardly on the mower, the resistance offered by the ground to the movement of the roller 32' will cause the stand to oscillate clockwise about its fulcrum at 320, whereby the ground wheels 21 will be lowered into contact with the earth and, assuming the engine to be in operation, propulsion of the mower will be resumed.

The use of the guard plate 44 to prevent grass clipping from being thrown on to the engine is optional. The guard plate, as shown, is screwed at 45 to the lower side of the crank case and projects therefrom forwardly over the reel 8.

The fact that my improved propulsion device does not require any connection either to the reel 8 or the ground wheels 9 of the mower, and the fact that no clutch is required for starting or stopping or reverse, makes it possible to provide mower propulsion at very great savings in cost. Additional and very substantial savings are reported by the fact that my improved propulsion device is applicable to mowers already existing and which may be perfectly serviceable. The use of such a device is facilitated by the throttling control which is effected without conscious effort on the part of the operator in the course of the normal movement by which the operator lifts the handle lever to interrupt mower operation. It will further be noted that in the case of the simplified mechanism shown in Fig. 6, it is not even necessary for the operator to provide consciously for the manipulation of the stand, this being biased toward its effective supporting position to automatically assume such position whenever the handle lever is raised.

I claim:

1. For application to a conventional lawn mower normally adapted for hand propulsion and comprising a frame having studs for a guiding handle, a propelling unit comprising a handle lever having at its forward end divergent arms apertured for engagement on said studs, a prime mover disposed between said arms and provided with bracket means wholly supporting it therefrom, said handle lever having no means of connection with the lawn mower frame other than said arms, ground wheel means having a mounting in unitary connection with said prime mover and connected therethrough with said arms, and an operative driving connection from said prime mover to said ground wheel means for the propulsion thereof and the driving of a connected lawn mower through said arms.

2. The combination set forth in claim 1 in which the mounting for said ground wheel means comprises a bracket, in further combination with a stand lever pivoted to said bracket and an operating link extending up the handle lever and provided near the end of the handle lever with an operating handle movable respecting the handle lever for effecting movement of the stand lever to and from retracted position, said stand lever being movable to a position in which it supports the handle lever with said ground wheel means free of ground contact.

3. The device of claim 2 in which said stand is biased for oscillation toward the position in which it supports said handle lever and assembly.

4. For application to a conventional lawn mower normally adapted for hand propulsion and comprising a frame having studs for a guiding handle, a propelling unit comprising a handle lever having at its forward end divergent arms apertured for engagement on said studs, a prime mover disposed between said arms and provided with bracket means wholly supporting it therefrom, said handle lever having no means of connection with the lawn mower frame other than said arms, ground wheel means having a mounting in unitary connection with said prime mover and connected therethrough with said arms, an operative driving connection from said prime mover to said ground wheel means for the propulsion thereof and the driving of a connected lawn mower through said arms, a stand lever pivoted to said ground wheel mounting and an operating link extending up the handle lever and provided near the end of the handle lever with an operating handle movable respecting the handle lever for effecting movement of the stand lever to and from retracted position, said stand lever being movable to a position in which it supports the handle lever with said ground wheel means free of ground contact, said stand lever being biased for movement toward said position and being disengageable from said position by ground contact when said handle lever is pushed forwardly.

5. A device of the character described comprising the combination with a lawn mower handle lever provided with means for pivotally connecting such lever with a mower, of a propulsion device in unitary assembly with the lever and comprising a prime mover, a traction wheel, and speed reducing gearing affording an operative connection from the engine to the traction wheel, the traction wheel being mounted remote from said connecting means, whereby to be adapted to be moved to and from ground engagement by the pivotal movement of said handle lever respecting the mower, together with a stand in hinged connection with the handle lever assembly for operative adjustment to a position in which such stand is in supporting relation to the assembly with said traction wheel out of ground contact, and roller means for ground contact at the lower end of the stand.

6. The device of claim 5 in which said stand is provided with means biasing it toward said position.

7. The device of claim 5 in which said stand is provided with manually operable connections for adjusting it to and from said position, said connections comprising a manually oscillatable grip on said handle lever, and a link connecting said grip with said stand.

8. The combination in a lawn mower handle lever provided with means for its pivotal connection with a mower, of a prime mover and traction wheel in operative unitary assembly with said lever, said traction wheel being remote from said connection and being adapted to be moved to and from ground engagement by the pivotal movement of the lever, an oscillatory hand grip on said lever, a speed control for the prime mover, and a connection from the speed control to the hand grip for manipulating the speed control upon the oscillation of the hand grip occurring incidentally to the lifting of said lever in the course of disengaging said traction wheel from the ground.

9. The combination with a lawn mower handle lever, of a traction wheel carried thereby to be moved to and from the ground by manipulation of said lever, a prime mover operatively connected to drive said wheel, a second ground wheel, a support therefor adjustably mounted in unitary connection with the lever, said support being movable to and from a position in which said second ground wheel supports said lever and carries said traction wheel free of contact with the ground, said second ground wheel in said position of said support engaging a rotatable portion of said traction wheel to receive motion therefrom, whereby said second ground wheel operates in a reverse direction over the ground.

10. A self-propelled implement comprising a traction wheel, a prime mover in operative connection therewith, a support for the traction wheel pivotally movable between lowered and elevated positions, the traction wheel contacting the ground in the lower position of its said support and being lifted above the ground in the elevated position of said support, a stand in hinged connection with said support, a ground wheel rotatably mounted on the stand and movable therewith to and from engagement with said traction wheel, said ground wheel, when engaged with said traction wheel, being driven in a reverse direction while said stand carries said support in its elevated position.

11. The combination with a lawn mower handle lever adapted for pivotal connection with a mower, of a traction wheel provided with a hub, a prime mover, reduction gearing providing an operative driving connection from the prime mover to the traction wheel, means whereby the prime mover, the traction wheel and gearing are operatively connected unitarily with said handle lever for pivotal movement therewith to and from a position in which said traction wheel is engaged with the ground for the propulsion of the mower, a stand in hinged connection with said assembly, a second traction wheel upon the stand, and means for oscillating the stand to a position in which said second traction wheel and stand are in supporting relation to the assembly the first traction wheel being free of the ground in said position and the second traction wheel being frictionally engaged with said hub to receive motion therefrom.

ALFRED KUEHN.

REFERENCES CITED

The following references are of record in the file of this patent:

UNITED STATES PATENTS

| Number | Name | Date |
|---|---|---|
| 1,022,291 | Anthony | Apr. 2, 1912 |
| 1,085,379 | Coldwell | Jan. 27, 1914 |
| 1,417,485 | Baldwin | May 30, 1922 |
| 1,454,698 | Byerley | May 8, 1923 |
| 1,504,863 | Brown | Aug. 12, 1924 |
| 1,866,380 | Wagner | July 5, 1932 |
| 2,133,512 | Herge | Oct. 18, 1938 |
| 2,209,356 | Schreck | July 30, 1940 |

FOREIGN PATENTS

| Number | Country | Date |
|---|---|---|
| 539,091 | France | Mar. 28, 1922 |